United States Patent
Chiu et al.

(10) Patent No.: US 10,161,581 B1
(45) Date of Patent: Dec. 25, 2018

(54) POLE FIXING STRUCTURE FOR LAMP AND ILLUMINATION DEVICE USING THE SAME

(71) Applicants: LITE-ON ELECTRONICS (GUANGZHOU) LIMITED, Guangzhou (CN); LITE-ON TECHNOLOGY CORPORATION, Taipei (TW)

(72) Inventors: Tsan-Li Chiu, Taipei (TW); Yen-Hung Liu, Taipei (TW); Po-Chang Li, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/858,039

(22) Filed: Dec. 29, 2017

(30) Foreign Application Priority Data

Aug. 4, 2017 (TW) .............................. 106126472 A (51) Int. Cl.
*F21S 8/08* (2006.01)
*F16L 37/02* (2006.01)
*F21V 17/12* (2006.01)
*F21W 131/103* (2006.01)

(52) U.S. Cl.
CPC .............. *F21S 8/086* (2013.01); *F16L 37/02* (2013.01); *F21V 17/12* (2013.01); *F21W 2131/103* (2013.01)

(58) Field of Classification Search
CPC ... F21S 8/086; F21V 17/12; F21W 2131/103; F16L 37/02
See application file for complete search history.

(56) References Cited

U.S. PATENT DOCUMENTS

| 9,638,403 B1 * | 5/2017 | Marshal | F21V 21/108 |
| 2006/0004679 A1 * | 1/2006 | Cahill-O'Brien | G01R 11/56 |
| | | | 705/412 |

* cited by examiner

*Primary Examiner* — Ali Alavi
(74) *Attorney, Agent, or Firm* — McClure, Qualey & Rodack, LLP (57) ABSTRACT

A pole fixing structure for fixing a lamp is provided. The pole fixing structure includes a multi-axial adapter and a positioning structure. The multi-axial adapter includes a fixed seat, a movable seat and a steering member. The fixed seat has first and second axial pole inserting holes. The movable seat has first and second size openings. The first size opening corresponds to the first axial pole inserting hole. The steering member is disposed on the movable seat in the first axis, wherein the movable seat rotates around the steering member with respect to the fixed seat, so that the second size opening corresponds to the second axial pole inserting hole. The positioning structure is disposed on the multi-axial adapter for fixing the first axial pole in the first size opening or fixing the second axial pole in the second size opening.

10 Claims, 9 Drawing Sheets

POLE FIXING STRUCTURE FOR LAMP AND ILLUMINATION DEVICE USING THE SAME

This application claims the benefit of Taiwan application Serial No. 106126472, filed Aug. 4, 2017, the subject matter of which is incorporated herein by reference.

BACKGROUND OF THE INVENTION

Field of the Invention

The invention relates in general to a fixing structure, and more particularly to a pole fixing structure for the lamp and an illumination device using the same.

Description of the Related Art

Currently, the road illumination lamp has following shortcomings in terms of installation. (1) Since a lamp pole of a particular size can only go with a pole fixing structure of the corresponding size, the lamp pole cannot be installed if the size of the lamp pole is incompatible with the size of the pole fixing structure. (2) Current lamp assembly requires complicated processes and is labor consuming. (3) Current lamp assembly requires long working hours and incurs huge labor cost.

SUMMARY OF THE INVENTION

The invention is directed to a pole fixing structure for lamp and an illumination device using the same. Through the use of a multi-axial adapter matching a pole of different sizes and a positioning structure, the lamp is assembled on the pole, so that the labor can be saved, the assembly process can be simplified and the working hours and the cost can be reduced.

According to one embodiment of the invention, a pole fixing structure for fixing a lamp on a first axial pole or a second axial pole is provided. The pole fixing structure includes a multi-axial adapter and a positioning structure. The multi-axial adapter includes a fixed seat, a movable seat and a steering member. The fixed seat has a first axial pole inserting hole and a second axial pole inserting hole. The movable seat is received in the fixed seat and has a first size opening and a second size opening. The first size opening corresponds to the first axial pole inserting hole. The steering member is disposed on the movable seat in the first axis, wherein the movable seat rotates around the steering member with respect to the fixed seat, so that the second size opening corresponds to the second axial pole inserting hole. The positioning structure is disposed on the multi-axial adapter for fixing the first axial pole in the first size opening or fixing the second axial pole in the second size opening.

According to another embodiment of the invention, an illumination device including a lamp and a pole fixing structure is provided. The pole fixing structure is disposed on the lamp for fixing the lamp on a first axial pole or a second axial pole. The pole fixing structure includes a multi-axial adapter and a positioning structure. The multi-axial adapter includes a fixed seat, a movable seat and a steering member. The fixed seat has a first axial pole inserting hole and a second axial pole inserting hole. The movable seat is received in the fixed seat, and has a first size opening and a second size opening. The first size opening corresponds to the first axial pole inserting hole. The steering member is disposed on the movable seat in the first axis, wherein the movable seat rotates around the steering member with respect to the fixed seat, so that the second size opening corresponds to the second axial pole inserting hole. The positioning structure is disposed on the multi-axial adapter for fixing the first axial pole in the first size opening or fixing the second axial pole in the second size opening.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements.

Figure 1A:
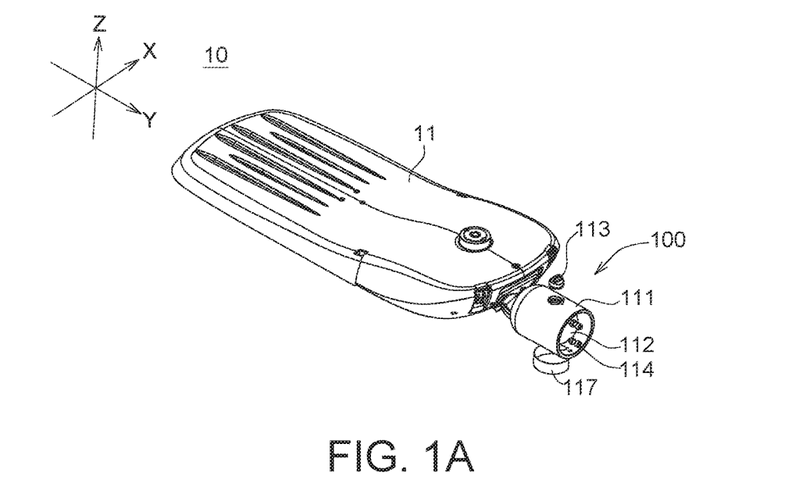
FIG. 1A is a schematic diagram of an illumination device according to an embodiment of the invention.
Figure 1B:
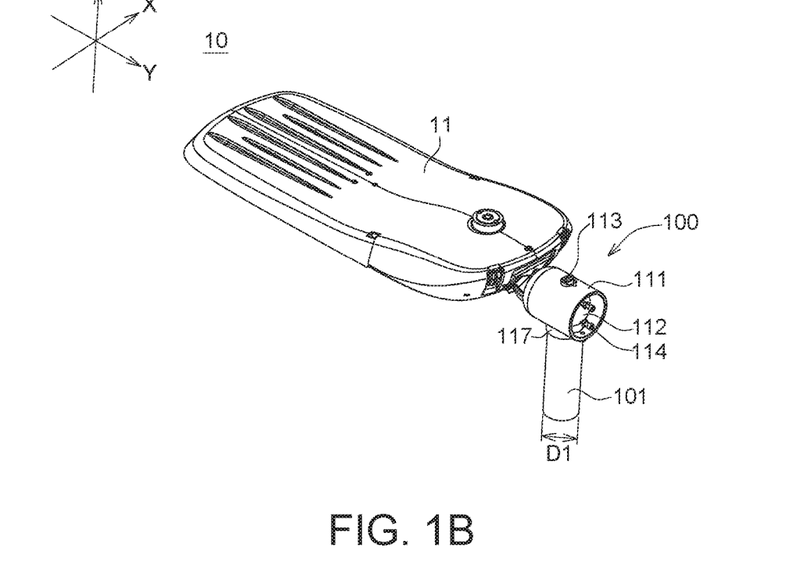
FIGS. 1B and 1C respectively are a schematic diagram of a lamp installed on first axial pole and the second axial pole
Figure 1C:
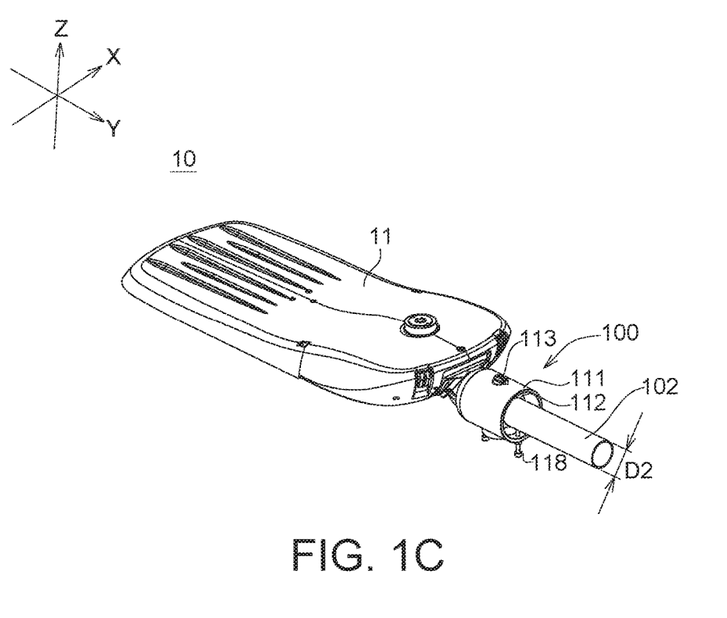

FIG. 1A is a schematic diagram of an illumination device 10 according to an embodiment of the invention. FIG. 1B is a schematic diagram of a lamp 11 of an illumination device 10 installed on a first axial pole 101. FIG. 1C is a schematic diagram of a lamp 11 of an illumination device 10 installed on a second axial pole 102. The illumination device 10 includes a lamp 11 and a pole fixing structure 100 disposed on the lamp 11.

Refer to FIGS. 1A-1C. The pole fixing structure 100 is for fixing a lamp 11 in a first axial pole 101 or a second axial pole 102. The lamp 11 can be realized by an LED lamp 11 or other types of lamp. The first axial pole 101 can be a pole vertical to the ground. The second axial pole 102 can be a pole parallel to the ground or an inverted L-shaped pole having a mating end parallel to the ground. Viewing from the X-Y plane on which the ground is located, the lamp 11 extends along an X-Y plane defined by an X axis and a Y axis; the first axial pole 101 extends along a Z axis vertical to the X-Y plan. That is, the X axis and the Y axis respectively are orthogonal to the first axial pole 101; the second axial pole 102 extends along the X axis or the Y axis. As indicated in FIG. 1C, the second axial pole 102 extends along the Y axis. In another embodiment (not illustrated), the second axial pole 102 may extend along the X axis, and the invention is not limited thereto.

Figure 2A:
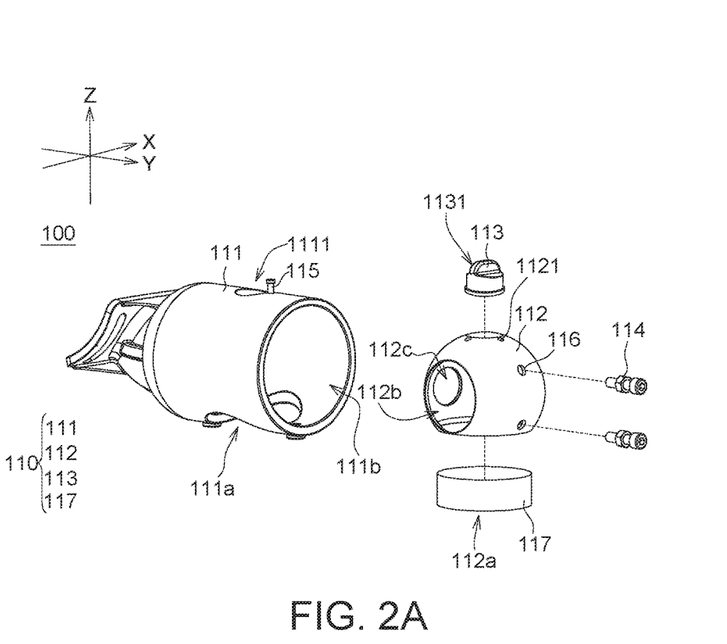
FIGS. 2A-2C are assembly diagrams of the pole fixing structure of FIG. 1B for fixing the lamp on the first axial pole.
Figure 2B:
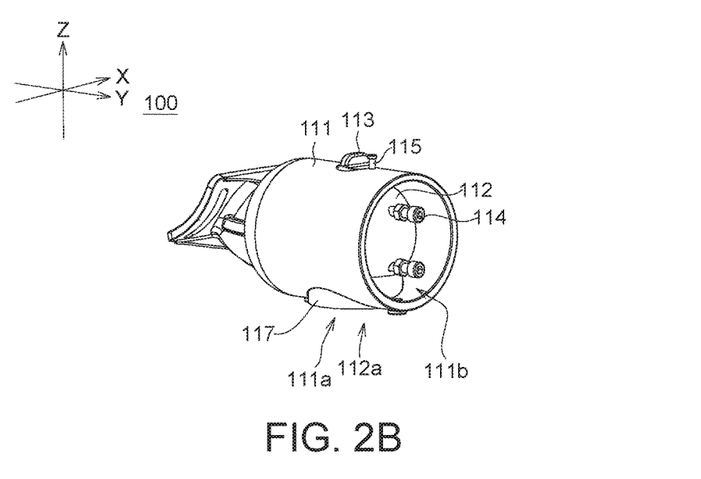
Figure 2C:
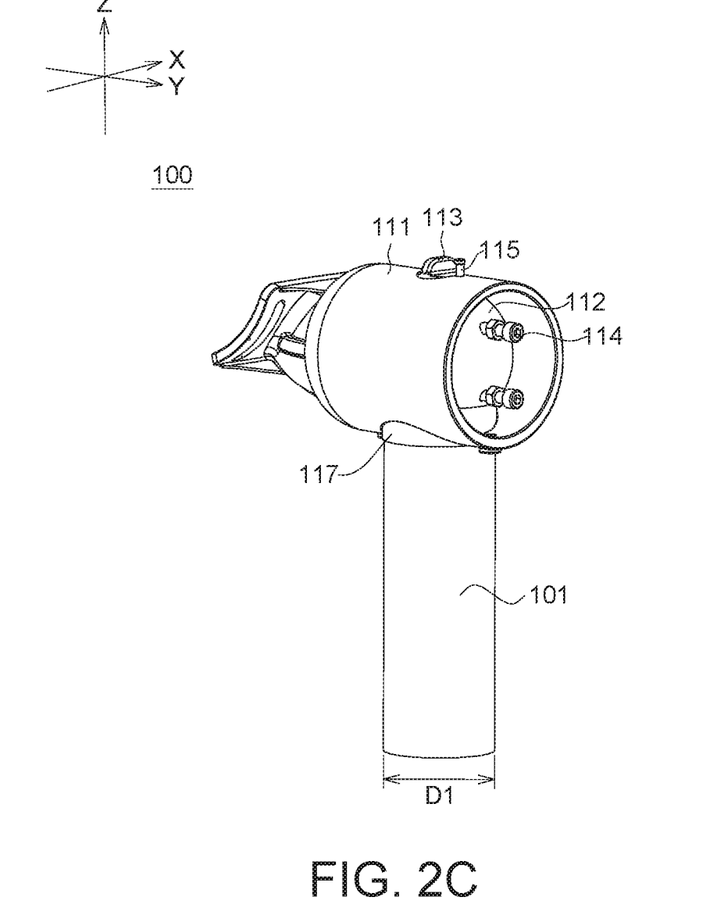
Figure 3A:
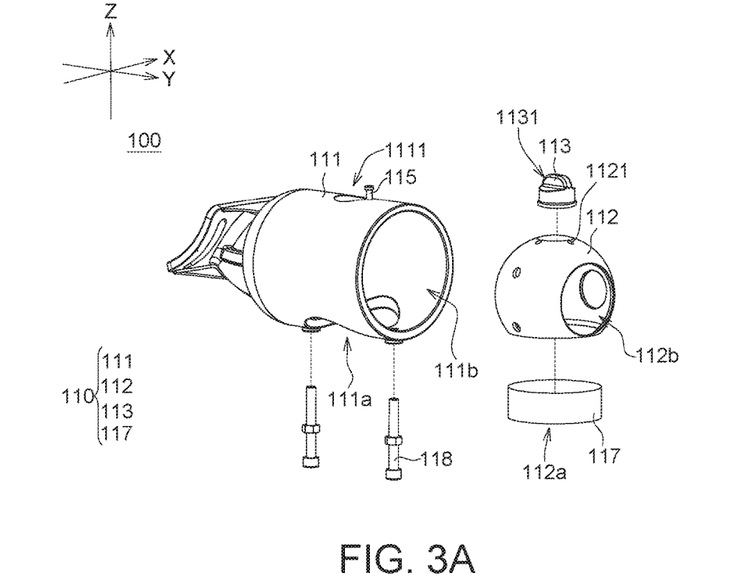
FIGS. 3A-3C are assembly diagrams of the pole fixing structure of FIG. 1C for fixing the lamp on the second axial pole.
Figure 3B:
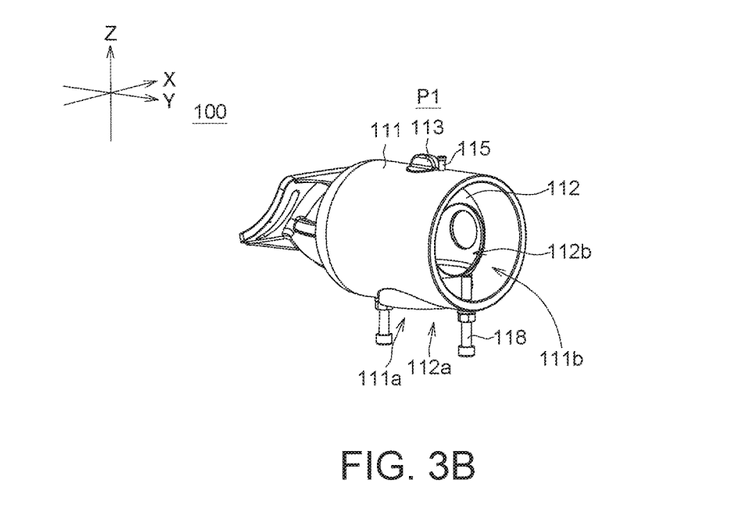
Figure 3C:
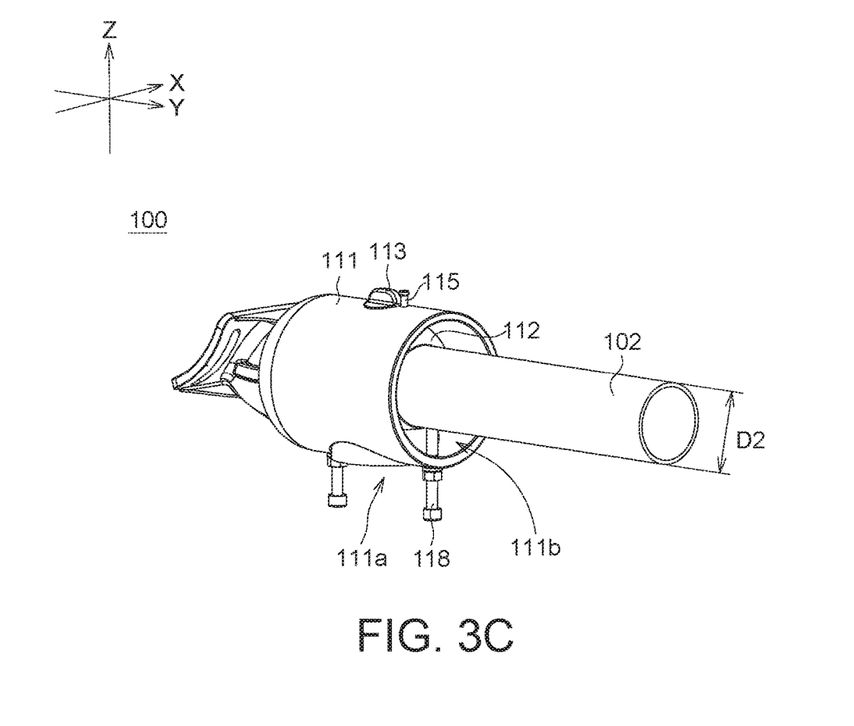

FIGS. 2A-2C are assembly diagrams of the pole fixing structure 100 of FIG. 1B for fixing a lamp 11 on a first axial pole 101. FIGS. 3A-3C are assembly diagrams of the pole fixing structure 100 of FIG. 1C for fixing a lamp 11 on a second axial pole 102.

Refer to FIGS. 2A and 3A. The pole fixing structure 100 includes a multi-axial adapter 110 and a first positioning structure 114 or a second positioning structure 118. The multi-axial adapter 110 includes a fixed seat 111, a movable seat 112 and a steering member 113. The fixed seat 111 has a first axial pole inserting hole 111a and a second axial pole inserting hole 111b. Preferably, the diameter of the first axial pole inserting hole 111a is smaller than that of the movable seat 112, so that the movable seat 112 will not come off the first axial pole inserting hole 111a. The diameter of the second axial pole inserting hole 111b is slightly larger than that of the movable seat 112, so that the movable seat 112 can be assembled to the fixed seat 111 through the second axial pole inserting hole 111b. The fixed seat 111 and the lamp 11 can be fixed using screws, integrally formed in one piece, or interconnected in other ways (not illustrated). The movable seat 112 is received in the fixed seat 111 and has a first size opening 112a and a second size opening 112b. The steering member 113 is disposed on the movable seat 112 in the first axis (such as the Z axis, but it is not limited to Z axis). The movable seat 112 rotates around the steering member 113 with respect to the fixed seat 111, so that the second size opening 112b corresponds to the second axial pole inserting hole 111b. No matter how the steering member 113 rotates, the first size opening 112a always corresponds to the first axial pole inserting hole 111a.

The movable seat 112 may be a hollowed sphere. The first size opening 112a may be an opening having a diameter of 76 mm. The second size opening 112b may be an opening having a diameter of 60 mm. The first size opening 112a is larger than the second size opening 112b. In another embodiment, the first size opening 112a may be smaller than or equivalent to the second size opening 112b, and the invention is not limited thereto.

FIG. 2B illustrates the situation that the first size opening 112a corresponds to the first axial pole inserting hole 111a. FIG. 3B illustrates the situation that the second size opening 112b corresponds to the second axial pole inserting hole 111b when the steering member 113 rotates around the first axis (such as the Z axis) and moves to a first position P1. The steering member 113 may include a handle 1131 for the user to grasp. The installation process includes following steps: When the movable seat 112 is installed on the fixed seat 111, the steering member 113 is installed on the movable seat 112 through a top opening 1111 by using a bolt, a lock or a buckle, so that the user can conveniently apply a force to rotate the movable seat 112 around the first axis (such as the Z axis). The handle 1131 may be I-shaped or cross-shaped, and the steering member 113 may be replaced by a detachable structure, but the invention is not limited thereto.

In an embodiment, the pole fixing structure 100 further includes a positioning pole 115 for fixing the movable seat 112. When the positioning pole 115 is released, the movable seat 112 can rotate in the fixed seat 111. In an embodiment, the movable seat 112 has multiple inserting holes 1121 (four inserting holes are illustrated in the diagram), and the positioning pole 115 can movably pass through the fixed seat 111 and be inserted into one of the inserting holes 1121 of the movable seat 112. The positioning pole 115 may be a positioning pin, a spring pin, a latch or a screw for holding the movable seat 112.

Refer to FIG. 2A. The multi-axial adapter 110 further includes a ring member 117 disposed on the movable seat 112 and surrounding the first size opening 112a. Refer to FIGS. 2B and 2C. The ring member 117 is embedded in the first axial pole inserting hole 111a, and the first axial pole 101 can be mounted in the ring member 117 and be positioned in the first size opening 112a. The ring member 117 can enhance the tightening force and maintain the center line of the first size opening 112a to be in the first axis to avoid the first axial pole 101 tilting when the first axial pole 101 is inserted into the first size opening 112a. In an embodiment, the ring member 117 may be fixed on the movable seat 112 using a bolt, a lock or a buckle.

Refer to FIG. 2C. In an embodiment, the first axial pole inserting hole 111a is for receiving the insertion of the first axial pole 101 and has a diameter between 76 mm-32 mm. The first size opening 112a can be received by the first axial pole 101 having a diameter D1 between 76 mm-32 mm. The first axial pole 101 can be fixed in the first size opening 112a by a first positioning structure 114. Refer to FIG. 2A. The first positioning structure 114 can be realized by two positioning screws extending along the second axis (that is, the Y axis) and passing through two screw holes 116 of the movable seat 112. The first positioning structure 114 can be fixed and lean on the surface of the first axial pole 101 to generate a holding force. The quantities of the screw holes 116 and the positioning screws are not limited to two, and may also be one or more than two.

Refer to FIG. 3C. In another embodiment, when the second size opening 112b corresponds to the second axial pole inserting hole 111b, the second axial pole 102 having a diameter between 60 mm-32 mm can be received in the second axial pole inserting hole 111b, the second size opening 112b can be received by the second axial pole 102 having a diameter D2 between 60 mm-32 mm, and the second axial pole 102 can be fixed in the second size opening 112b by a second positioning structure 118. The second positioning structure 118 can be realized by two positioning screws extending along the first axis (that is, X axis) and passing through two screw holes 119 of the fixed seat 111. The second positioning structure 118 can be fixed and lean on the surface of the second axial pole 102. The quantities of the screw holes 119 and the positioning screws are not limited to two, and may also be one or more than two.

As indicated in FIGS. 2C and 3C, when the first axial pole 101 is not in use, the ring member 117 can be covered with a cover (not illustrated) to avoid external objects entering the pole fixing structure 100 through the unsealed first axial pole inserting hole 111a. Or, when the second axial pole 102 is not in use, the second axial pole inserting hole 111b can be covered with a cover (not illustrated) to avoid external objects entering the pole fixing structure 100 through the unsealed second axial pole inserting hole 111b.

Figure 4A:
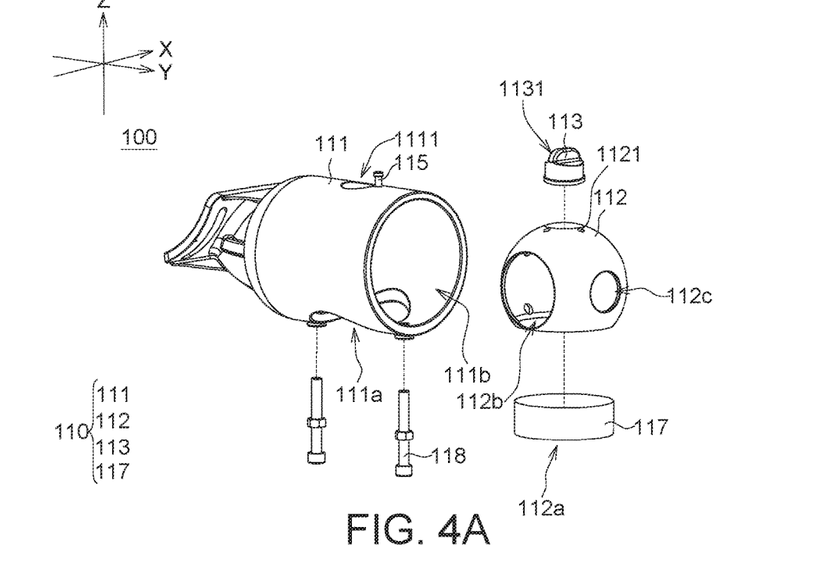
FIGS. 4A-4C are assembly diagrams of a pole fixing structure for fixing the lamp on the second axial pole.
Figure 4B:
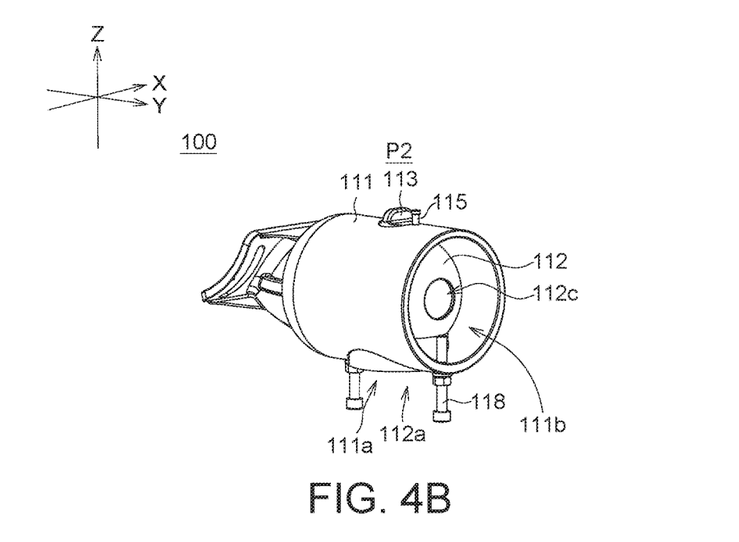
Figure 4C:
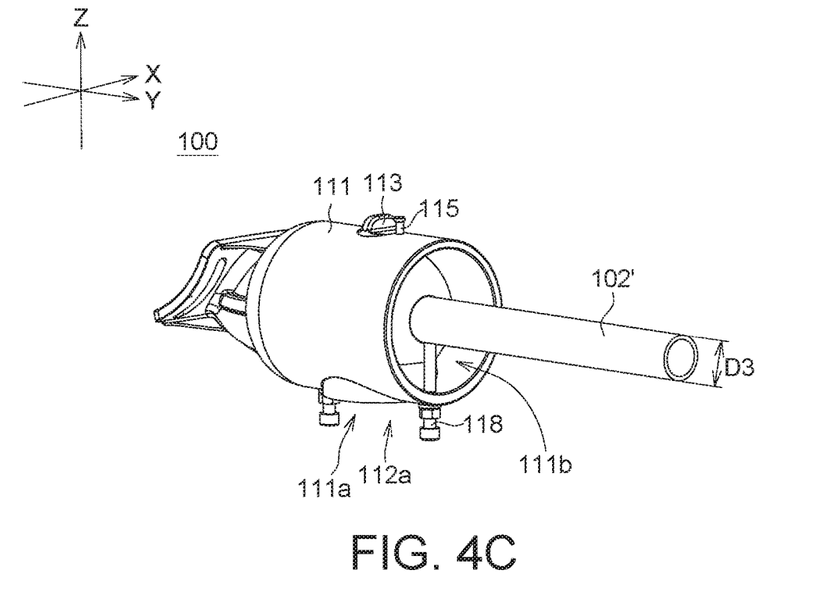

Refer to FIGS. 4A-4C. In another embodiment, the movable seat 112 further includes a third size opening 112c, which may be realized by an opening having a diameter of 32 mm. The second size opening 112b may be realized by an opening having a diameter of 60 mm. The second size opening 112b is larger than the third size opening 112c. When the steering member 113 rotates around the first axis and moves to a second position P2 from the first position P1 (referring to FIG. 3C), the third size opening 112c corresponds to the second axial pole inserting hole 111b. The diameter of the second axial pole 102' is smaller than 32 mm. The third size opening 112c can be received by the second axial pole 102' having a diameter smaller than 32 mm. The second axial pole 102' is fixed in the third size opening 112c by the positioning structure 118. The positioning structure 118 can be realized by two positioning screws passing through the fixed seat 111 and extending along the first axis (such as the Z axis) and can be fixed and leans on the surface of the second axial pole 102'.

Figure 5:
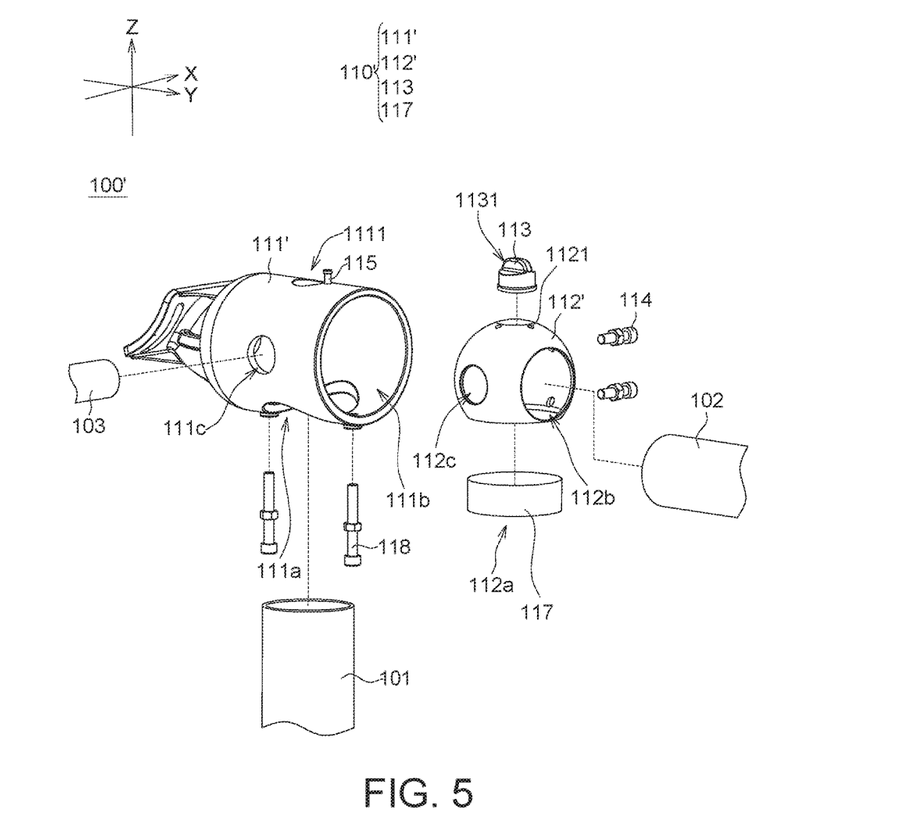
FIG. 5 is a schematic diagram of a pole fixing structure according to another embodiment of the invention.

Refer to FIG. 5. The pole fixing structure 100' according to another embodiment of the invention includes a multi-axial adapter 110' and a first positioning structure 114 or a second positioning structure 118. The present embodiment is different from the above embodiments in that the fixed seat 111' further includes a third axial pole inserting hole 111c in addition to the first axial pole inserting hole 111a and the second axial pole inserting hole 111b. Besides, the movable seat 112' further includes a third size opening 112c in addition to the first size opening 112a and the second size opening 112b. When the steering member 113 rotates to the first position P1 (referring to FIG. 3B), the third size opening 112c corresponds to the third axial pole inserting hole 111c for receiving the third axial pole 103, and the third axial pole 103 can be fixed on the movable seat 112' in the third axis (such as X axis) by the fixing structure (not illustrated). The second size opening 112b is different from the third size opening 112c. The third size opening 112c can be realized by an opening having a diameter of 32 mm and can be received by the third axial pole 103 having a diameter smaller than 32 mm. Descriptions of other elements can be obtained with reference to other embodiments, and are not repeated here.

According to the pole fixing structure disclosed in the above embodiments of the invention, through the multi-axial adapter matching the pole of different sizes (such as the pole having a diameter of 76 mm, 60 mm, or 32 mm diameter) and the positioning structure, the lamp is assembled on the pole. During assembly, an opening of a particular size and a pole of the corresponding size are joined together to avoid the problem of installation failure which would otherwise occur if the size of the pole size is incompatible with the size of the pole fixing structure. Besides, the multi-axial adapter has a simple assembly structure, such that the labor can be saved, the assembly process can be simplified and the working hours and the cost can be reduced.

While the invention has been described by way of example and in terms of the preferred embodiment(s), it is to be understood that the invention is not limited thereto. On the contrary, it is intended to cover various modification and similar arrangements and procedures, and the scope of the appended claims therefore should be accorded the broadest interpretation so as to encompass all such modification and similar arrangements and procedures.

What is claimed is:

1. A pole fixing structure for fixing a lamp on a first axial pole or a second axial pole, comprising:
    a multi-axial adapter, comprising:
        a fixed seat having a first axial pole inserting hole and a second axial pole inserting hole;
        a movable seat received in the fixed seat and having a first size opening and a second size opening, wherein the first size opening corresponds to the first axial pole inserting hole; and
        a steering member disposed on the movable seat in the first axis, wherein the movable seat rotates around the steering member with respect to the fixed seat, so that the second size opening corresponds to the second axial pole inserting hole; and
    a positioning structure disposed on the multi-axial adapter for fixing the first axial pole in the first size opening or fixing the second axial pole in the second size opening.

2. The pole fixing structure according to claim 1, wherein the first size opening is different from the second size opening, a diameter of the first axial pole inserting hole is smaller than a diameter of the movable seat, and a diameter of the second axial pole inserting hole is larger than the diameter of the movable seat.

3. The pole fixing structure according to claim 1, wherein the movable seat further comprises a third size opening, when the steering member around the first axis rotates to a first position, the second size opening corresponds to the second axial pole inserting hole, when the steering member around the first axis rotates to a second position, the third size opening corresponds to the second axial pole inserting hole, the second size opening is different from the third size opening.

4. The pole fixing structure according to claim 1, further comprising a positioning pole, wherein the movable seat has multiple inserting holes, and the positioning pole movably passes through the fixed seat and be inserted into one of the inserting holes of the movable seat.

5. The pole fixing structure according to claim 1, further comprising a ring member disposed on the movable seat, wherein the ring member surrounds the first size opening and is embedded in the first axial pole inserting hole.

6. The pole fixing structure according to claim 1, wherein the positioning structure comprises a first positioning structure passing through the movable seat and extending along the second axis, and the first positioning structure is fixed and leans on the surface of the first axial pole, or the positioning structure comprises a second positioning structure passing through the fixed seat and extending along the first axis, and the second positioning structure is fixed and leans on the surface of the second axial pole.

7. The pole fixing structure according to claim 1 for fixing the lamp on a third axial pole, wherein the movable seat has a third size opening corresponding to the third axial pole, and the positioning structure is for fixing the third axial pole in the third size opening different from the second size opening.

8. An illumination device, comprising:
    a lamp;
    a pole fixing structure disposed on the lamp for fixing the lamp on a first axial pole or a second axial pole, wherein the pole fixing structure comprises:
        a multi-axial adapter, comprising:
            a fixed seat having a first axial pole inserting hole and a second axial pole inserting hole;
            a movable seat received in the fixed seat and having a first size opening and a second size opening, wherein the first size opening corresponds to the first axial pole inserting hole; and
            a steering member disposed on the movable seat in the first axis, wherein the movable seat rotates around the steering member with respect to the fixed seat, so that the second size opening corresponds to the second axial pole inserting hole; and
        a positioning structure disposed on the multi-axial adapter for fixing the first axial pole in the first size opening or fixing the second axial pole in the second size opening.

9. The illumination device according to claim 8, wherein the first size opening is different from the second size opening, a diameter of the first axial pole inserting hole is smaller than a diameter of the movable seat, a diameter of the second axial pole inserting hole is larger than the diameter of the movable seat, and the movable seat further comprises a third size opening; when the steering member rotates around the first axis to a first position, the second size opening corresponds to the second axial pole inserting hole; when the steering member rotates around the first axis to a second position, the third size opening corresponds to the second axial pole inserting hole, and the second size opening is different from the third size opening.

10. The illumination device according to claim 8, further comprising a positioning pole and a ring member, wherein the movable seat has multiple inserting holes, and the positioning pole movably passes through the fixed seat and is inserted into one of the inserting holes of the movable seat, wherein the ring member is disposed on the movable seat, the ring member surrounds the first size opening and is embedded in the first axial pole inserting hole.

* * * * *